(12) United States Patent
Takenaka

(10) Patent No.: US 9,997,123 B2
(45) Date of Patent: Jun. 12, 2018

(54) SWITCHING POWER SUPPLY CIRCUIT, LIQUID CRYSTAL DRIVING DEVICE, AND LIQUID CRYSTAL DISPLAY DEVICE

(71) Applicant: Rohm Co., Ltd., Kyoto (JP)

(72) Inventor: Seiji Takenaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 16 days.

(21) Appl. No.: 15/186,737

(22) Filed: Jun. 20, 2016

(65) Prior Publication Data

US 2016/0379581 A1    Dec. 29, 2016

(30) Foreign Application Priority Data

Jun. 23, 2015 (JP) .................................. 2015125648

(51) Int. Cl.
*G09G 3/36* (2006.01)
*H02M 3/156* (2006.01)
*H02M 1/32* (2007.01)

(52) U.S. Cl.
CPC ......... *G09G 3/3648* (2013.01); *G09G 3/3696* (2013.01); *H02M 1/32* (2013.01); *H02M 3/156* (2013.01); *G09G 2310/0289* (2013.01); *G09G 2330/021* (2013.01); *G09G 2330/04* (2013.01)

(58) Field of Classification Search
CPC ...... H02M 3/156; H02M 3/157; H02M 3/158; H02M 3/16; H02M 2003/1566; H02M 2001/0003; H02M 2001/327; H02M 1/08; H02M 1/32; H05B 33/0815; G09G 2300/0819; G09G 2310/0251; G09G 2310/0289; G09G 2310/08; G09G 2320/064; G09G 2330/02; G09G 2330/021; G09G 2330/00; G09G 2330/04; G09G 3/3648; G09G 3/3696; H03K 7/08

See application file for complete search history.

(56) References Cited

U.S. PATENT DOCUMENTS

| | | | | |
|---|---|---|---|---|
| 5,399,958 A * | 3/1995 | Iyoda | ........................ | G05F 1/66 323/282 |
| 6,137,702 A * | 10/2000 | Hall | ...................... | H02M 3/157 323/272 |
| 6,181,092 B1 * | 1/2001 | Turner | .................. | H02M 3/156 318/254.2 |
| 6,465,993 B1 * | 10/2002 | Clarkin | ................. | H02M 3/156 323/272 |
| 7,459,894 B2 * | 12/2008 | Li | ........................ | H02M 3/156 323/285 |
| 2005/0088159 A1 * | 4/2005 | Itohara | .................. | H02M 3/156 323/284 |

(Continued)

FOREIGN PATENT DOCUMENTS

JP    H05-219650    8/1993

Primary Examiner — Tom Sheng
(74) Attorney, Agent, or Firm — Fish & Richardson P.C.

(57) ABSTRACT

A switching power supply circuit has: a switching output generator that generates an output voltage from an input voltage by using an output transistor; a switching controller that turns ON and OFF the output transistor so as to keep the output voltage, or a feedback voltage commensurate therewith, with a predetermined reference voltage; and a maximum duty controller that varies the maximum duty of the output transistor according to the reference voltage, the output voltage, or the feedback voltage.

10 Claims, 12 Drawing Sheets

(56) References Cited

U.S. PATENT DOCUMENTS

| | | | | |
|---|---|---|---|---|
| 2005/0141251 | A1* | 6/2005 | Allwyn | H02M 3/33507 |
| | | | | 363/95 |
| 2007/0090819 | A1* | 4/2007 | Hasegawa | H02M 3/156 |
| | | | | 323/282 |
| 2008/0007233 | A1* | 1/2008 | Hane | H02M 3/156 |
| | | | | 323/282 |
| 2009/0302816 | A1* | 12/2009 | Kunimatsu | H02M 1/36 |
| | | | | 323/282 |
| 2014/0049237 | A1* | 2/2014 | Hara | H02M 3/156 |
| | | | | 323/271 |
| 2014/0218657 | A1* | 8/2014 | Haruta | G09G 3/342 |
| | | | | 349/61 |
| 2015/0256060 | A1* | 9/2015 | Faingersh | H02M 1/36 |
| | | | | 323/267 |
| 2015/0312983 | A1* | 10/2015 | Hu | F21K 9/1355 |
| | | | | 315/186 |
| 2016/0049871 | A1* | 2/2016 | Ihs | H02J 4/00 |
| | | | | 323/271 |
| 2017/0213510 | A1* | 7/2017 | Takenaka | G09G 3/3648 |

* cited by examiner

SWITCHING POWER SUPPLY CIRCUIT, LIQUID CRYSTAL DRIVING DEVICE, AND LIQUID CRYSTAL DISPLAY DEVICE

CROSS-REFERENCE TO RELATED APPLICATIONS

This application is based on Japanese Patent Application No. 2015-125648 filed on Jun. 23, 2015, the contents of which are hereby incorporated by reference.

BACKGROUND OF THE INVENTION

1. Field of the Invention

The present invention relates to switching power supply circuits, liquid crystal driving devices, and liquid crystal display devices.

2. Description of Related Art

Conventionally, switching power supply circuits are widely and commonly used as electric power supplying means in a variety of applications.

An example of conventional technology related to what has just been mentioned is seen in Japanese Patent Application Publication No. H05-219650.

Inconveniently, conventional switching power supply circuits leave room for improvement in terms of their overcurrent protection function.

SUMMARY OF THE INVENTION

In view of the above-mentioned inconvenience encountered by the present inventor, an object of the invention disclosed herein is to provide a switching power supply circuit that achieves appropriate overcurrent protection with respect to its output current, and to provide a liquid crystal driving device and a liquid crystal display device incorporating such a switching power supply circuit.

According to one aspect of what is disclosed herein, a switching power supply circuit includes: a switching output generator that generates an output voltage from an input voltage by using an output transistor; a switching controller that turns ON and OFF the output transistor so as to keep the output voltage, or a feedback voltage commensurate therewith, with a predetermined reference voltage; and a maximum duty controller that varies the maximum duty of the output transistor according to the reference voltage, the output voltage, or the feedback voltage.

According to another aspect of what is disclosed herein, a liquid crystal driving device includes a switching power supply circuit as described above as a means for supplying electric power to wherever the electric power is required in the device.

According to yet another aspect of what is disclosed herein, a liquid crystal display device includes: a liquid crystal driving device as described above; and a liquid crystal display panel that is driven by the liquid crystal driving device.

Other features, elements, steps, benefits, and characteristics of the present invention will become clear from the following description of preferred embodiments taken in conjunction with the accompanying drawings.

DETAILED DESCRIPTION OF PREFERRED EMBODIMENTS

Figure 1:
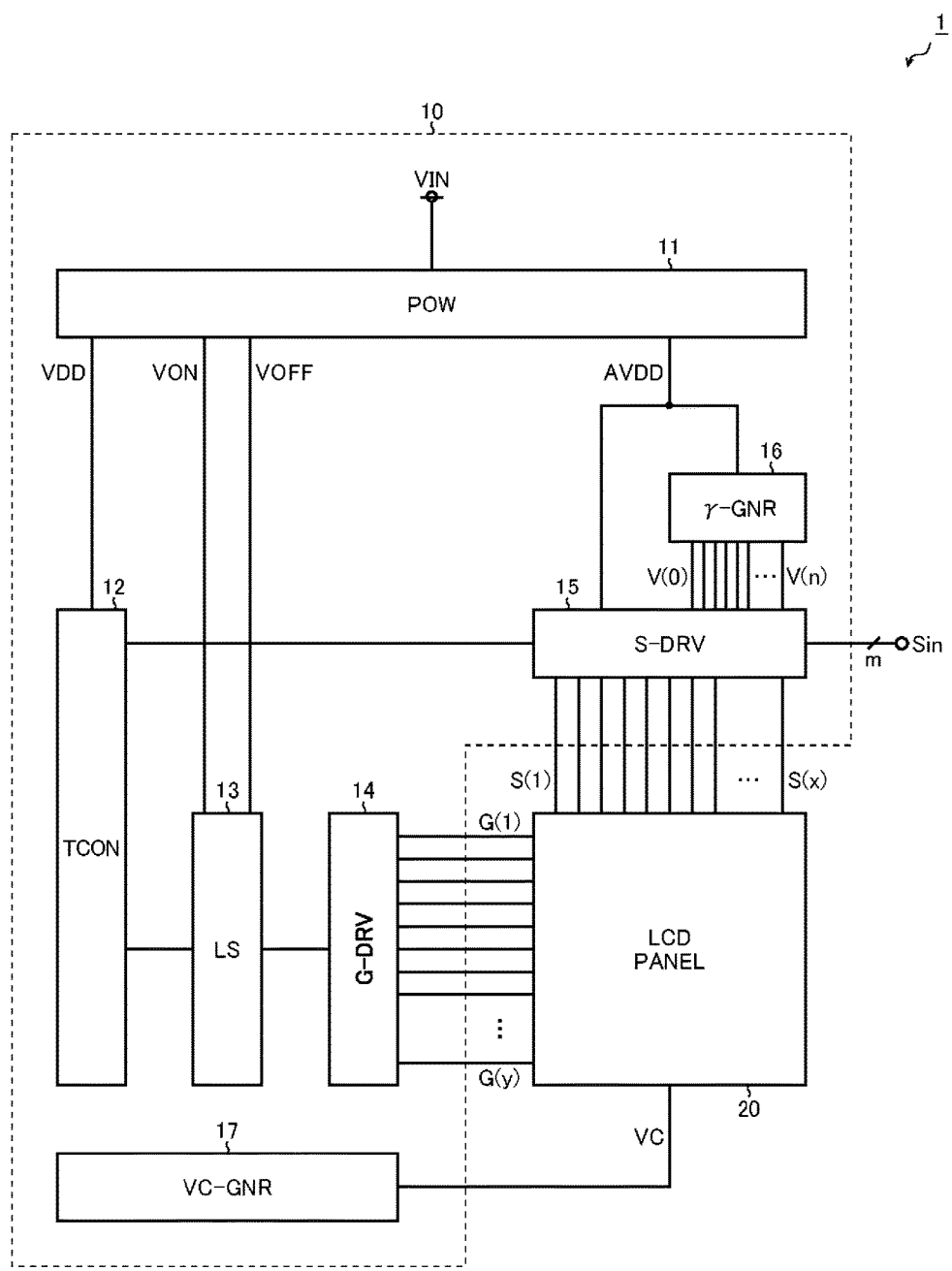
FIG. 1 is a block diagram showing one configuration example of a liquid crystal display device.

Liquid Crystal Display Device:

FIG. 1 is a block diagram showing one configuration example of a liquid crystal display device. The liquid crystal display device of this configuration example includes a liquid crystal driving device 10 and a liquid crystal display panel 20. The liquid crystal driving device 10 drives the liquid crystal display panel 20 on the basis of a video signal Sin and various commands fed from an unillustrated host device (such as a microprocessor). The liquid crystal display panel 20 is a video outputting means that uses liquid crystal elements as pixels.

Liquid Crystal Driving Device:

With reference to FIG. 1, the liquid crystal driving device 10 will now be described in detail. In this configuration example, the liquid crystal driving device 10 includes a system power supply 11, a timing controller 12, a level shifter 13, a gate driver 14, a source driver 15, and a gamma voltage generator 16, and a common voltage generator 17.

The system power supply 11 operates by being supplied with an input voltage VIN (e.g., +12 V). The system power supply 11 generates an analog-circuitry supply voltage AVDD (e.g., +17 V), a logic-circuitry supply voltage VDD (e.g., +3.3 V, +1.8V, or +1.2 V), a positive supply voltage VON (e.g., +28 V), and a negative supply voltage VOFF (e.g., −12V), and feeds these voltages to different parts of the device.

The timing controller 12 operates by being supplied with the logic-circuitry supply voltage VDD. The timing controller 12 engages in timing control (such as vertical synchronization control for the gate driver 14 and horizontal synchronization control for the source driver 15) in the liquid crystal driving device 10 on the basis of commands and data fed from the host device.

The level shifter 13 operates by being supplied with the positive supply voltage VON and the negative supply voltage VOFF. The level shifter 13 shifts the level of a timing control signal (vertical synchronizing signal) fed from the timing controller 12, and feeds the result to the gate driver 14.

The gate driver 14 generates gate signals G(1) to G(y) for the liquid crystal display panel 20 on the basis of the vertical synchronizing signal fed from the level shifter 13, and feeds them to the liquid crystal elements of the liquid crystal display panel 20 (in a case where the liquid crystal display panel 20 is of an active-matrix type, to the gate terminals of the active elements that are connected to those liquid crystal elements respectively).

The source driver 15 operates by being supplied with the analog-circuitry supply voltage AVDD. The source driver 15 converts the digital (m-bit) video signal Sin fed from the unillustrated host device into analog source signals S(1) to S(x), and feeds them to the liquid crystal elements of the liquid crystal display panel 20 (in a case where the liquid crystal display panel 20 is of an active-matrix type, to the source terminals of the active elements that are connected to those liquid crystal elements respectively).

The gamma voltage generator 16 operates by being supplied with the analog-circuitry supply voltage AVDD. The gamma voltage generator 16 generates $2^m$-level gradation voltages V(0) to V(n) (where n=$2^m$−1), and feeds them to the source driver 15. The gradation voltages V(0) to V(n) correspond on a one-to-one basis to data values "0" to "n", respectively, of the video signal Sin.

The common voltage generator 17 generates a predetermined common voltage VC, and feeds it to the liquid crystal elements of the liquid crystal display panel 20 (in a case where the liquid crystal display panel 20 is of an active-matrix type, to the drain terminals of the active elements that are connected to those liquid crystal elements respectively).

Figure 2:
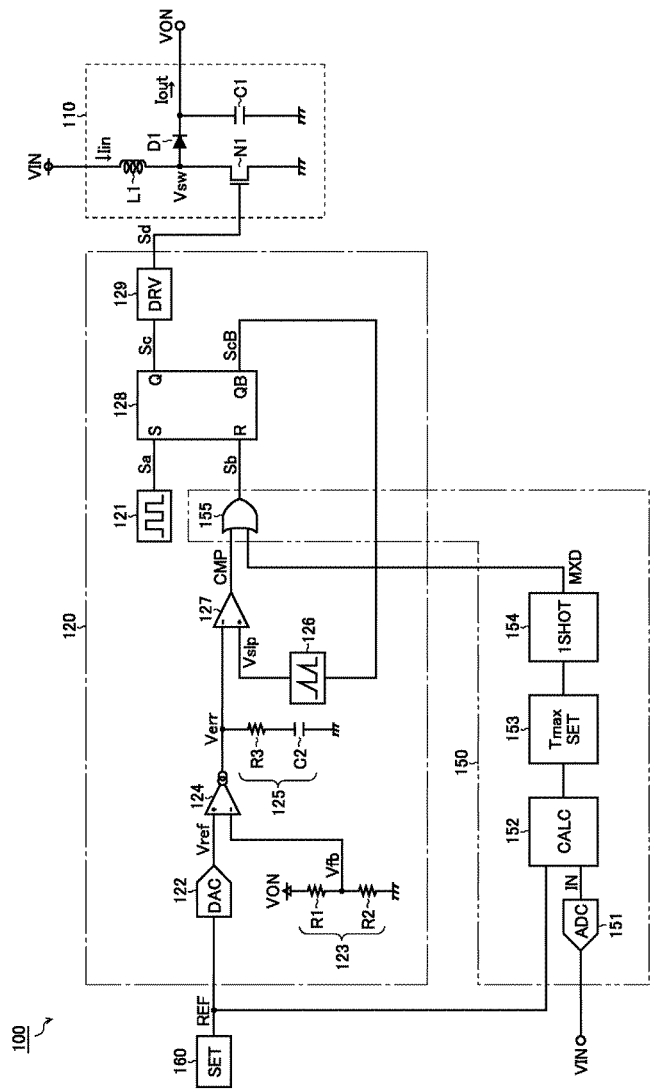
FIG. 2 is a circuit diagram of a switching power supply circuit according to a first embodiment of the present invention.

Switching Power Supply Circuit (First Embodiment):

FIG. 2 is a circuit diagram of a switching power supply circuit incorporated in the system power supply 11 according to a first embodiment of the present invention. The switching power supply circuit 100 according to this embodiment is a circuit portion that generates a desired positive supply voltage VON (corresponding to an output voltage) from the input voltage VIN, and includes a switching output generator 110, a switching controller 120, a maximum duty controller 150, and a reference voltage setter 160.

The switching output generator 110 is a step-up switching output stage that generates the positive supply voltage VON from the input voltage VIN, and includes an output transistor N1 (in the illustrated example, an N-channel MOS (metal-oxide-semiconductor) field-effect transistor), a coil L1, a diode D1, and a capacitor C1.

A first end of the coil L1 is connected to an application terminal of the input voltage VIN. A second end of the coil L1 is connected to a drain of the output transistor N1 and to an anode of the diode D1. A source of the output transistor N1 is connected to a ground terminal. A gate of the output transistor N1 is connected to an output terminal of the switching controller 120 (i.e., an output terminal of a gate signal Sd). A cathode of the diode D1 is connected to an output terminal of the positive supply voltage VON and to a first end of the capacitor C1. A second end of the capacitor C1 is connected to the ground terminal.

The switching controller 120 is an output feedback circuit portion that turns the output transistor N1 ON and OFF so as to keep a feedback voltage Vfb, which is a voltage commensurate with the positive supply voltage VON, equal to a predetermined reference voltage Vref. The switching controller 120 includes a clock signal generator 121, a digital/analog converter 122, a feedback voltage generator 123, an error amplifier 124, a phase compensator 125, a slope voltage generator 126, a comparator 127, an RS flip-flop 128, and a driver 129.

The clock signal generator 121 generates a clock signal at a predetermined switching frequency f (=1/T), and feeds it, as a set signal Sa, to the RS flip-flop 128.

The digital/analog converter 122 generates an analog reference voltage Vref from a digital reference voltage setting signal REF.

The feedback voltage generator 123 includes resistors R1 and R2 that are connected in series between an application terminal of the positive supply voltage VON and the ground terminal, and outputs, from the connection node between the resistors R1 and R2, the feedback voltage Vfb (=[R2/(R1+R2)]×VON), which is a division voltage of the positive supply voltage VON. However, in a case where the positive supply voltage VON falls within the input dynamic range of the switching controller 120, the feedback voltage generator 123 may be omitted, in which case the positive supply voltage VON may be directly accepted as the feedback voltage Vfb.

The error amplifier 124 is a transconductance amplifier (so-called gm amplifier) of a current-output type. The error amplifier 124 generates an error voltage Verr by charging and discharging a capacitor C2, which constitutes part of the phase compensator 125, according to the difference between the feedback voltage Vfb, which is fed to an inverting input terminal (−) of the error amplifier 124, and the reference voltage Vref, which is fed to a non-inverting input terminal (+) of the error amplifier 124. When the feedback voltage Vfb is lower than the reference voltage Vref, a current is injected into to the capacitor C2 from the error amplifier 124, and thus the error voltage Verr rises. In contrast, when the feedback voltage Vfb is higher than the reference voltage Vref, a current is extracted from the capacitor C2 to the error amplifier 124, and thus the error voltage Verr falls.

The phase compensator 125 is a time constant circuit that includes a resistor R3 and a capacitor C2 that are connected in series between an output terminal of the error amplifier 124 and the ground terminal, and engages in phase compensation for the error voltage Verr.

The slope voltage generator 126 generates a slope voltage Vslp that is synchronous with the ON/OFF control of the output transistor N1 (in the illustrated example, an inverted pulse-width-modulation signal ScB). The slope voltage Vslp is an analog voltage with a saw-tooth waveform that starts to rise when the output transistor N1 turns ON and that is reset to zero when the output transistor N1 turns OFF.

The comparator 127 generates a comparison signal CMP by comparing the error voltage Verr, which is fed to an inverting input terminal (−) of the comparator 127, with the slope voltage Vslp, which is fed to a non-inverting input terminal (+) of the comparator 127. The comparison signal CMP is at low level when the error voltage Verr is higher than the slope voltage Vslp, and is at high level when the error voltage Verr is lower than the slope voltage Vslp.

The RS flip-flop 128 outputs, from an output terminal (Q) thereof, a pulse-width-modulation signal Sc according to the set signal Sa, which is fed to a set terminal (S) of the RS flip-flop 128, and a reset signal Sb, which is fed to a reset terminal (R) of the RS flip-flop 128. The pulse-width-modulation signal Sc is set to high level at a rising edge in the set signal Sa, and is reset to low level at a rising edge in the reset signal Sb. However, when the set signal Sa and the reset signal Sb turn to high level simultaneously, the reset signal Sb is given priority. The RS flip-flop 128 concurrently outputs, from an inverted output terminal (QB) thereof, the inverted pulse-width-modulation signal ScB (i.e., the logical inversion of the pulse-width-modulation signal Sc).

The driver 129 is fed with the pulse-width-modulation signal Sc. The driver 129 augments the current capacity of the pulse-width-modulation signal Sc to generate the gate signal Sd for the output transistor N1 (corresponding to an ON/OFF control signal for the output transistor N1), and feeds it to a gate of the output transistor N1. The output transistor N1 is ON when the gate signal Sd is at high level, and is OFF when the gate signal Sd is at low level.

The maximum duty controller 150 is a circuit portion that varies the maximum duty DonMAX of the output transistor N1 according to both the reference voltage Vref (the data value of the reference voltage setting signal REF) and the input voltage VIN. The maximum duty controller 150 includes an analog/digital converter 151, a calculator 152, a maximum ON-period setter 153, a maximum duty setting signal generator 154, and an OR gate 155.

The analog/digital converter 151 converts the analog input voltage VIN into a digital input voltage signal IN, and feeds it to the calculator 152.

The calculator 152 calculates the upper limit value of an input current Iin that passes into the switching power supply circuit 100 (i.e., the coil current through the coil L1) according to both the reference voltage setting signal REF and the input voltage signal IN, and varies the maximum duty DonMAX of the output transistor N1 according to the calculated result. However, in a case where the input voltage VIN is constant, there is no need to refer to the input voltage signal IN, and accordingly the analog/digital converter 151 can be omitted. How the upper limit of the input current Iin is calculated will be described later.

The maximum ON-period setter 153 varies the maximum ON-period Tmax of the output transistor N1 according to the result calculated by the calculator 152 (i.e., the upper limit value of the input current Iin).

The maximum duty setting signal generator 154 generates a one-shot pulse in a maximum duty setting signal MXD at the lapse of a maximum ON-period Tmax after the RS flip-flop 128 is set by a pulse edge in the set signal Sa (i.e., the clock signal).

The OR gate 155 takes the logical sum between the comparison signal CMP and the maximum duty setting signal MXD, and outputs the result as the reset signal Sb. Accordingly, when a pulse edge appears in the comparison signal CMP before the lapse of the maximum ON-period Tmax after the RS flip-flop 128 is set, the pulse edge resets the RS flip-flop 128. On the other hand, when the maximum ON-period Tmax elapses with no pulse edge appearing in the comparison signal CMP after the RS flip-flop 128 is set, the one-shot pulse generated in the maximum duty setting signal MXD resets the RS flip-flop 128.

In this way, the maximum duty controller 150 configured as described above resets the RS flip-flop 128 forcibly, without waiting for a pulse edge in the comparison signal CMP, when the maximum ON-period Tmax elapses after the RS flip-flop 128 is set.

The reference voltage setter 160 generates the reference voltage setting signal REF, and feeds it to the switching controller 120 (more specifically, the digital/analog converter 122). The reference voltage setter 160 is provided with a function for varying the data value of the reference voltage setting signal REF according to a temperature sensor voltage VT. This function will be described in detail later.

Basic Operation (Step-Up Operation):

First, the basic operation (step-up operation) of the switching power supply circuit 100 will be described. When the output transistor N1 turns ON, a switching current passes through the coil L1 via the output transistor N1 to the ground terminal, and its electrical energy is stored in the coil L1. Meanwhile, the switching voltage Vsw that appears at the anode of the diode D1 drops, via the output transistor N1, down to approximately the ground voltage. Thus, the diode D1 is reversely biased, permitting no current to pass from the capacitor C1 to the output transistor N1.

On the other hand, when the output transistor N1 turns OFF, a back electromotive force occurs in the coil L1, causing the electrical energy stored there to discharge as a current. Meanwhile, the diode D1 is forward biased, and thus the current that passes through the diode D1 passes, as an output current Tout, from the output terminal of the positive supply voltage VON into a load (the level shifter 13); the same current also passes via the capacitor C1 to the ground terminal, charging the capacitor C1. The operation described thus far is repeated, so that the load is supplied with the positive supply voltage VON, which results from the input voltage VIN being stepped up.

Figure 3:
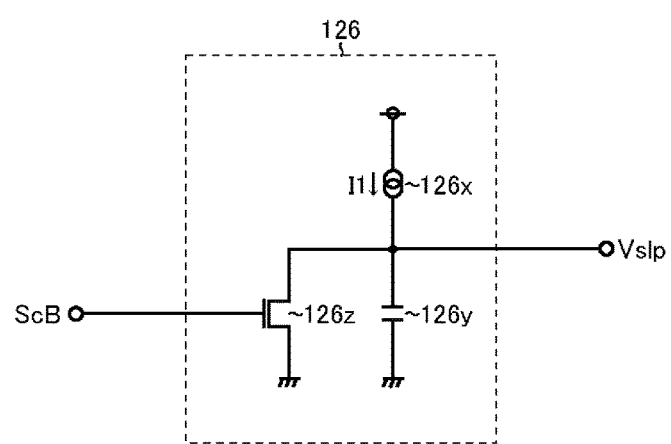
FIG. 3 is a circuit diagram showing one configuration example of a slope voltage generator.

Slope Voltage Generator:

FIG. 3 is a circuit diagram showing one configuration example of the slope voltage generator 126. The slope voltage generator 126 of this configuration example includes a current source 126x, a capacitor 126y, and an N-channel MOS field-effect transistor 126z.

The current source 126x is connected between a supply power terminal and a first end of the capacitor 126y (i.e., an output terminal of the slope voltage Vslp), and generates a predetermined charge current I1.

The first end of the capacitor 126y is connected to the output terminal of the slope voltage Vslp. A second end of the capacitor 126y is connected to the ground terminal. When the transistor 126z is OFF, the capacitor 126y is charged by the current I1, and thus the slope voltage Vslp, which appears at the first end of the capacitor 126y, increases. On the other hand, when the transistor 126z is ON, the capacitor 126y is discharged via the transistor 126z, and thus the slope voltage Vslp is reset to a zero value.

The transistor 126z is a charge/discharge switch that switches between whether to charge or discharge the capacitor 126y according to the ON/OFF control of the output transistor N1. A drain of the transistor 126z is connected to the first end of the capacitor 126y. A source of the transistor 126z is connected to the ground terminal. A gate of the transistor 126z is connected to an application terminal of the inverted pulse-width-modulation signal ScB. Accordingly, the transistor 126z is ON when the inverted pulse-width-modulation signal ScB is at high level, and is OFF when the inverted pulse-width-modulation signal ScB is at low level.

Figure 4:
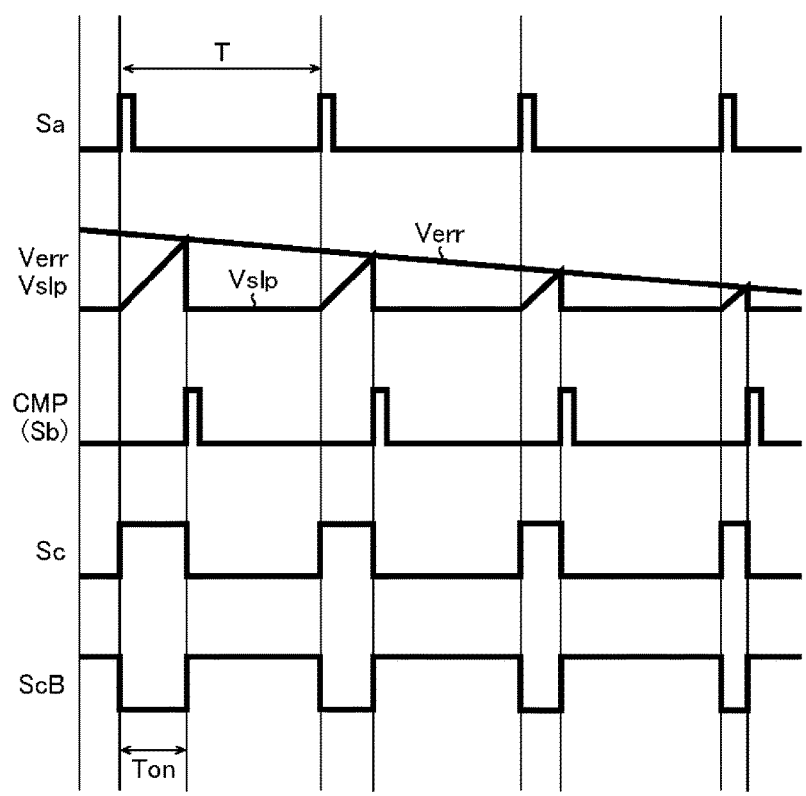
FIG. 4 is a timing chart showing one example of duty control.

Duty Control:

FIG. 4 is a timing chart showing one example of duty control based on the error voltage Verr, depicting, from top down, the set signal Sa, the error voltage Verr and the slope voltage Vslp, the comparison signal CMP (which is equivalent to the reset signal Sb when the maximum duty setting signal MXD is at low level), the pulse-width-modulation signal Sc, and the inverted pulse-width-modulation signal ScB.

When the set signal Sa rises to high level, the pulse-width-modulation signal Sc is set to high level; thus, the output transistor N1 turns ON. At this time, as the pulse-width-modulation signal Sc turns to low level, the transistor 126z turns OFF; thus the capacitor 126y starts to be charged by the current I1. Accordingly, the slope voltage Vslp starts to increase with a predetermined gradient.

Thereafter, when the slope voltage Vslp becomes higher than the slope voltage Vslp, the comparison signal CMP rises to high level, and the pulse-width-modulation signal Sc is reset to low level; thus, the output transistor N1 turns OFF. At this time, as the inverted pulse-width-modulation signal ScB turns to high level, the transistor 126z turns ON. As a result, the capacitor 126y is discharged quickly via the transistor 126z, and the slope voltage Vslp is reset to a zero value.

The higher the error voltage Verr, the later the time point that it crosses the slope voltage Vslp, resulting in a longer high-level period of the pulse-width-modulation signal Sc (i.e., a longer ON-period Ton of the output transistor N1), and hence a larger ON-duty Don of the output transistor N1 (i.e., a higher proportion of the ON-period Ton in the switching cycle T).

Reversely, the lower the error voltage Verr, the earlier the time point that it crosses the slope voltage Vslp, resulting in a shorter high-level period of the pulse-width-modulation signal Sc, and hence a smaller ON-duty Don of the output transistor N1.

In this way, in the switching power supply circuit 100, the ON-duty Don of the output transistor N1 is determined according to the error voltage Verr so that a desired positive supply voltage VON is produced from the input voltage VIN.

Figure 5:
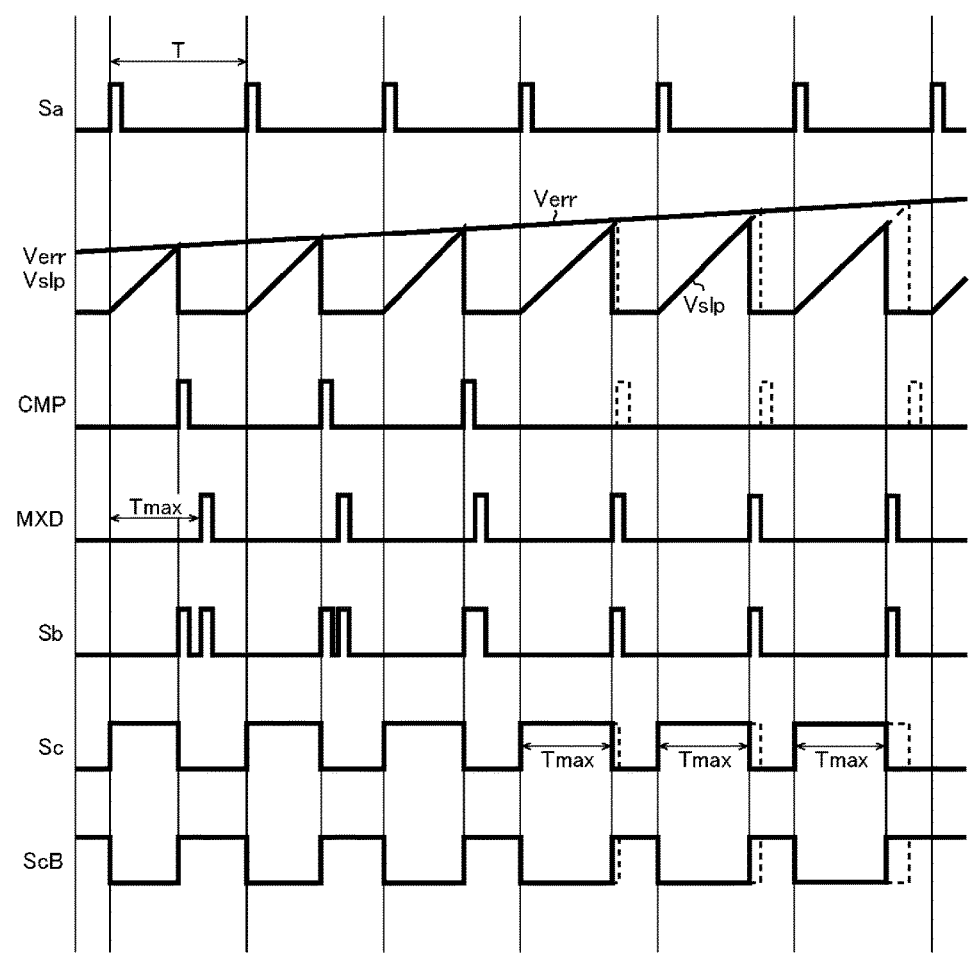
FIG. 5 is a timing chart showing basic operation of a maximum duty controller.

Maximum Duty Control:

FIG. 5 is a timing chart showing the basic operation of the maximum duty controller 150 (how the ON-duty Don of the output transistor N1 is restricted to the upper limit value), depicting, from top down, the set signal Sa, the error voltage Verr and the slope voltage Vslp, the comparison signal CMP, the maximum duty setting signal MXD, the reset signal Sb, the pulse-width-modulation signal Sc, and the inverted pulse-width-modulation signal ScB.

As mentioned earlier, the reset signal Sb is a logical sum signal that is at high level when at least one of the comparison signal CMP and the maximum duty setting signal MXD is at high level and that is at low level when these signals are both at low level.

Accordingly, when a rising pulse occurs in the comparison signal CMP before the lapse of the maximum ON-period Tmax after the pulse-width-modulation signal Sc is set to high level by a pulse edge in the set signal Sa, the pulse edge in the comparison signal CMP resets the pulse-width-modulation signal Sc to low level. This is a state where the ON-duty Don of the output transistor N1 has not yet reached the upper limit value (i.e., the maximum duty DonMAX) and is left unrestricted.

On the other hand, when the maximum ON-period Tmax elapses without the comparison signal CMP rising to high level after the pulse-width-modulation signal Sc is set to high level, a one-shot pulse generated in the maximum duty setting signal MXD resets the pulse-width-modulation signal Sc to low level. This is a state where the ON-duty Don of the output transistor N1 is restricted to the upper limit value that is commensurate with the maximum ON-period Tmax.

When the ON-duty Don of the output transistor N1 is restricted to the upper limit value, as the pulse-width-modulation signal Sc turns to high level, the slope voltage Vslp is reset to a zero value without crossing the error voltage Verr. Accordingly, in such a cycle, the operation to generate a pulse in the comparison signal CMP is skipped (see broken lines).

In this way, the maximum duty controller 150 resets the RS flip-flop 128 forcibly, without waiting for a pulse edge in the comparison signal CMP, when the maximum ON-period Tmax elapses after the RS flip-flop 128 is set. With this operation, it is possible to restrict the ON-duty Don of the output transistor N1 to an upper limit value.

Figure 6:
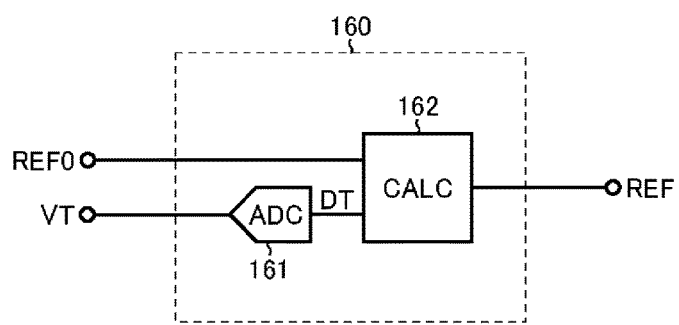
FIG. 6 is a block diagram showing one configuration example of a reference voltage setter.

Reference Voltage Setter:

FIG. 6 is a block diagram of one configuration example of the reference voltage setter 160. The reference voltage setter 160 of this configuration example includes an analog/digital converter 161 and a calculator 162.

The analog/digital converter 161 converts an analog temperature sensor voltage VT into a digital temperature sensor signal DT, and feeds it to the calculator 162. The temperature sensor voltage VT is an analog voltage signal whose voltage value varies with temperature Ta.

The calculator 162 calculates the data value of the reference voltage setting signal REF according to both an external reference voltage setting signal REF0, which is fed in from outside the circuit, and the temperature sensor signal DT.

That is, the reference voltage setter 160 is provided with a function of varying the data value of the reference voltage setting signal REF according to the temperature sensor voltage VT (and hence the temperature Ta) in such a way that the reference voltage Vref (and hence the positive supply voltage VON) has a desired temperature response.

Figure 7:
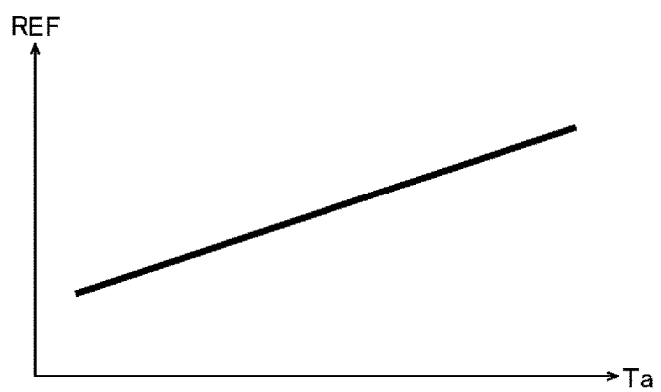
FIG. 7 is a diagram showing a correlation between temperature and a reference voltage setting signal.

FIG. 7 is a diagram showing a correlation between the temperature Ta and the reference voltage setting signal REF. With respect to the gate signals G(1) to G(y) for driving the liquid crystal display panel 20, it is preferable that the high-level voltage (i.e., positive supply voltage VON) and the low-level voltage (i.e., negative supply voltage VOFF) be raised as the temperature Ta rises.

Accordingly, in the reference voltage setter 160 described previously, as the temperature Ta rises, the data value of the reference voltage setting signal REF is increased so as to raise the positive supply voltage VON.

Overcurrent Protection Function:

Next, how the maximum duty controller 150 is exploited to achieve overcurrent protection will be described in detail.

Figure 8:
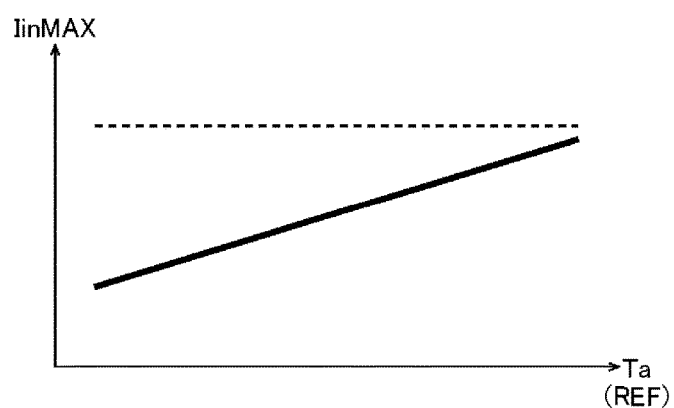
FIG. 8 is a diagram showing a correlation between temperature and an upper limit input current.
Figure 9:
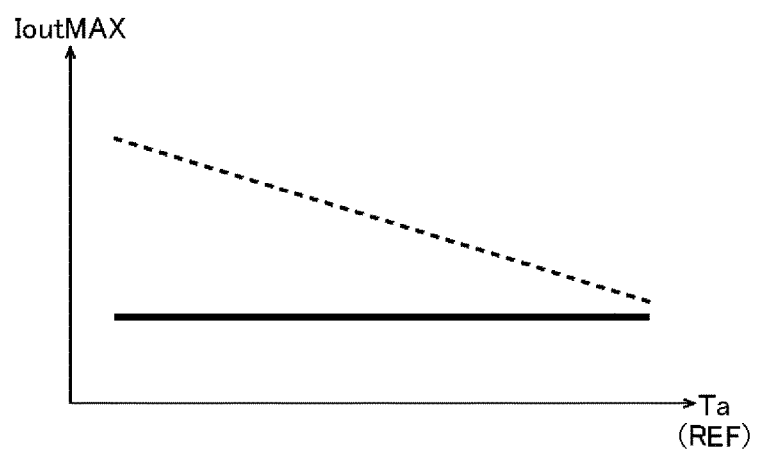
FIG. 9 is a diagram showing a correlation between temperature and an upper limit output current.

FIGS. 8 and 9 are diagrams showing correlations, with the temperature Ta (and hence the reference voltage setting signal REF), of an upper limit input current IinMAX (i.e., the upper limit value of the input current Iin) and an upper limit output current IoutMAX (i.e., the upper limit value of the output current Iout).

Suppose that the switching power supply circuit 100 has efficiency η. Then, for the input current Iin, the input voltage VIN, the output current Iout, and the output voltage VOUT (corresponding to the positive supply voltage VON), formula (1) below holds.

$$Iout = Iin \cdot \frac{VIN}{VOUT} \quad (1)$$

As shown in FIG. 7 referred to previously, as the temperature Ta rises, the data value of the reference voltage setting signal REF (corresponding to a set target value of the positive supply voltage VON) is increased. Accordingly, if, for the sake of discussion, the upper limit input current IinMAX is set at a constant value that does not depend on the temperature Ta (see the broken line in FIG. 8), as the temperature Ta rises, and thus the set target value of the positive supply voltage VON is raised, the upper limit output current IoutMAX decreases (see the broken line in FIG. 9).

If the upper limit output current IoutMAX varies with the temperature Ta in this way, an unintended high current may pass through the load, and this spoils the safety and stability of the system.

As a solution to this inconvenience, in the switching power supply circuit 100 according to the first embodiment, the upper limit input current IinMAX is varied according to the reference voltage setting signal REF.

Specifically, the calculator 152 calculates the upper limit input current IinMAX such that it behaves as indicated by a solid line in FIG. 8: as the temperature Ta rises (i.e., as the data value of the reference voltage setting signal REF is increased), the upper limit input current IinMAX is raised; reversely, as the temperature Ta falls (i.e., as the data value of the reference voltage setting signal REF is decreased), the upper limit input current IinMAX is lowered.

Method for Calculating the Upper Limit Value of the Input Current:

Suppose that the switching power supply circuit 100 has efficiency η, and that the input voltage VIN and the upper limit output current IoutMAX are constant. Then, the upper limit input current IinMAX that can pass through the output transistor N1 is given by formula (2) below. Preferably, the values of the constants a and b in the formula are searched for in a previously created database instead of being calculated when necessary.

$$IinMAX = a \cdot Vout + b \cdot \left(\frac{Vout - Vin}{Vout}\right) \quad (2)$$

In a case where the coil L1 has a sufficiently high inductance and the output current Tout is high, the upper limit input current IinMAX largely depends only on the first term in the right side (only on the output voltage VOUT). The output voltage VOUT varies with the maximum duty DonMAX; thus, the higher the maximum duty DonMAX, the higher the upper limit input current IinMAX, and the lower the maximum duty DonMAX, the lower the upper limit input current IinMAX.

Thus, varying the ON-duty Don is equivalent to varying the upper limit input current IinMAX. Accordingly, by varying the ON-duty Don with the reference voltage setting signal REF in such a way that the upper limit input current IinMAX has a temperature response as mentioned previously (see the solid line in FIG. 8), it is possible to keep the upper limit output current IoutMAX at a constant value that does not depend on the temperature Ta (see the solid line in FIG. 9).

In that case, to prevent current destruction of the output transistor N1, it is preferable to design the temperature response of the upper limit input current IinMAX appropriately such that the upper limit input current IinMAX does not become too high in the use temperature range.

Through the maximum duty control described above, the upper limit output current IoutMAX is kept at a constant value (see the solid line in FIG. 9) that does not depend on the temperature Ta (and hence the reference voltage setting signal REF). Accordingly, even in a case where the set target value of the positive supply voltage VON is varied according to the temperature Ta, there is no risk of an unintended high current passing through the load, and this helps enhance the safety and stability of the system.

Moreover, by implementing an overcurrent protection function exploiting the maximum duty controller 150, it is possible to achieve overcurrent protection with no need for a sense resistor or a connection terminal for it. This contributes to reducing the number of components, and the cost, of the switching power supply circuit 100.

Although the above description assumes that the input voltage VIN is constant, as will be understood from formula (1) above, the output current Tout depends not only on the input current Iin and the output voltage VOUT (i.e., the positive supply voltage VON) but also on the input voltage VIN. Accordingly, in a case where the input voltage VIN varies, the result of monitoring the input voltage VIN can be reflected in maximum duty control.

Specifically, the calculator 152 can calculate the upper limit input current IinMAX such that the higher the input voltage VIN, the upper limit input current IinMAX is lowered and, the lower the input voltage VIN, the upper limit input current IinMAX is raised.

Figure 10:
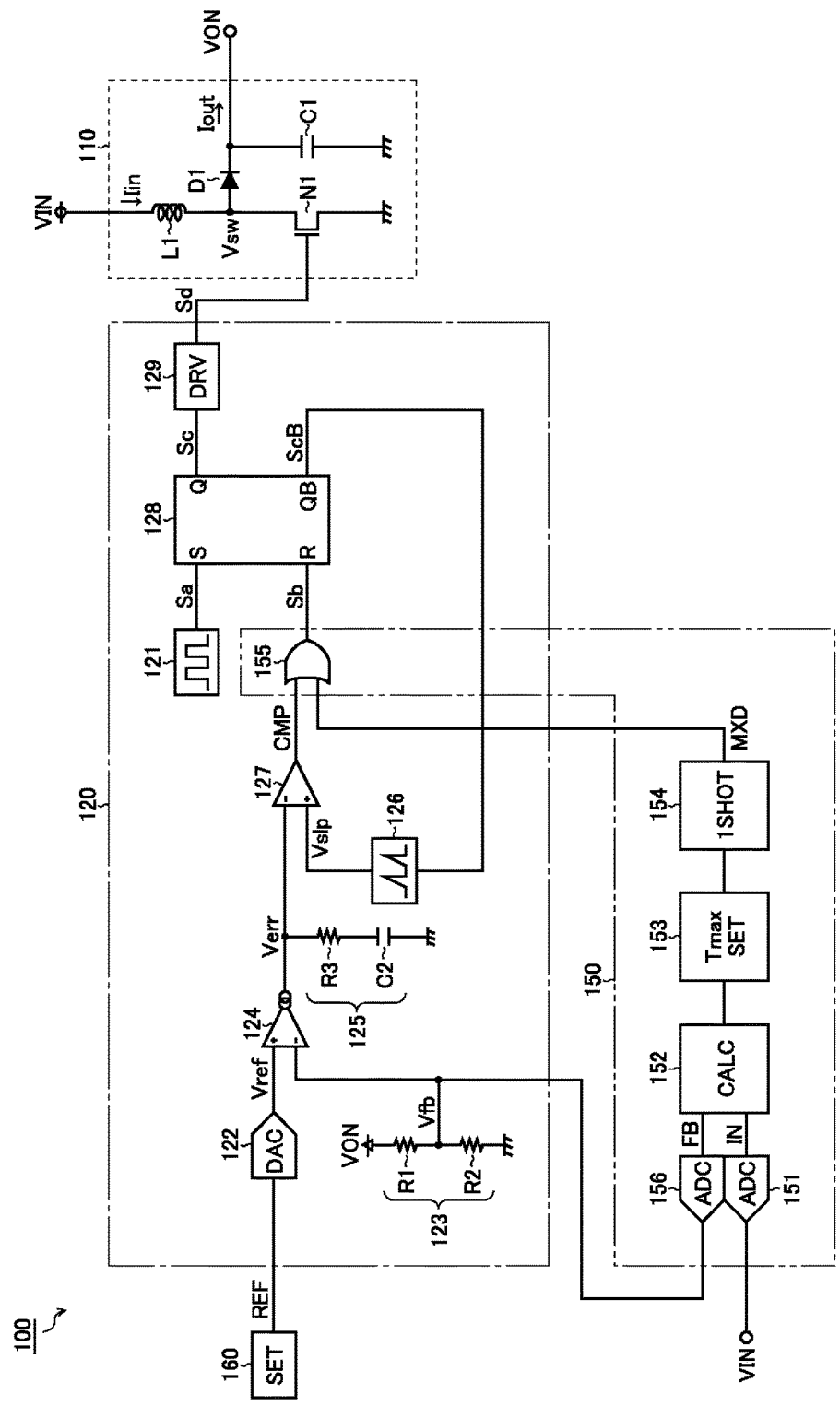
FIG. 10 is a circuit diagram showing a switching power supply circuit according to a second embodiment of the present invention.

Switching Power Supply Circuit (Second Embodiment):

FIG. 10 is a circuit diagram of a switching power supply circuit 100 according to a second embodiment of the present invention. The switching power supply circuit 100 according to this embodiment is based on the first embodiment, and is characterized distinctively in that the maximum duty controller 150 varies the maximum duty DonMAX of the output transistor N1 not according to the reference voltage setting signal REF but according to the feedback voltage Vfb. Accordingly, such components as find their counterparts in the first embodiment are identified by the same reference signs as in FIG. 2, and no overlapping description will be repeated; the following description focuses on features unique to the second embodiment.

In the switching power supply circuit 100 according to this embodiment, the maximum duty controller 150 includes, in addition to the components 151 to 155 mentioned previously, an analog/digital converter 156.

The analog/digital converter 156 converts the analog feedback voltage Vfb into a digital feedback voltage FB, and feeds it to the calculator 152. In a case where the positive supply voltage VON falls within the input dynamic range of the analog/digital converter 156, the positive supply voltage VON may be directly converted into a digital signal.

The calculator 152 calculates the upper limit value of the input current Iin that passes into the switching output generator 110 (i.e., the coil current through the coil L1) according to both the feedback voltage FB and the input voltage signal IN, and varies the maximum duty DonMAX of the output transistor N1 according to the calculated result. However, in a case where the input voltage VIN is constant, there is no need to refer to the input voltage signal IN, and accordingly the analog/digital converter 151 can be omitted. How the upper limit value of the input current Iin is calculated will be understood from the description given earlier, with the "reference voltage setting signal REF" read as the "feedback voltage FB", and therefore no overlapping description will be repeated.

Thus, also with the second embodiment, where the maximum duty DonMAX of the output transistor N1 is varied according to the feedback voltage Vfb (or the positive supply voltage VON) instead of the reference voltage Vref, appropriate overcurrent protection is achieved with respect to the output current Tout as in the first embodiment (FIG. 1) described previously.

Figure 11:
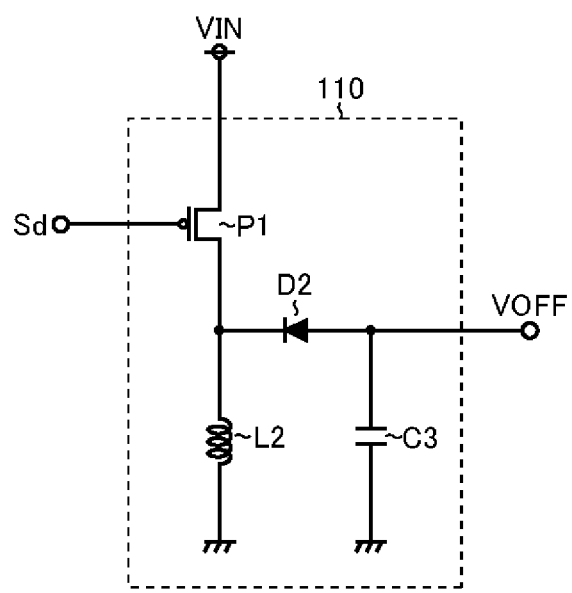
FIG. 11 is a circuit diagram showing a modified example of a switching output generator.

Switching Output Generator (Modified Example):

FIG. 11 is a circuit diagram showing one modified example of the switching output generator 110. The switching power supply circuit 100 of this modified example is an inverted-output (negative step-up) switching output stage that produces a negative supply voltage VOFF from an input voltage VIN, and includes an output transistor P1 (in the illustrated example, a P-channel MOS field-effect transistor), a coil L2, a diode D2, and a capacitor C3.

A first end of the coil L2 is connected to a ground terminal. A second end of the coil L2 is connected to a drain of the output transistor P1 and to a cathode of the diode D2. A source of the output transistor P1 is connected to an input terminal of the input voltage VIN. A gate of the output transistor P1 is connected to an output terminal of the switching controller 120 (i.e., an output terminal of a gate signal Sd). An anode of the diode D2 is connected to an output terminal of the negative supply voltage VOFF and to a first end of the capacitor C3. A second end of the capacitor C3 ins connected to the ground terminal.

First, the basic operation (output inverting operation) of the switching power supply circuit 100 will be described. When output transistor P1 turns on, a switching current passes through the coil L2 via the output transistor P1 to the ground terminal, and its electrical energy is stored in the coil L2. Meanwhile, the switching voltage Vsw that appears at the cathode of the diode D2 rises, via the output transistor P1, up to approximately the input voltage VIN. Thus, the diode D2 is reversely biased, permitting no current to pass from the capacitor C3 to the output transistor P1.

On the other hand, when the output transistor P1 turns OFF, a back electromotive force occurs in the coil L2, causing the electrical energy stored there to discharge as a current. Meanwhile, the diode D2 is forward biased, and thus a current passes through a closed loop leading from the ground terminal to the capacitor C3, then to the diode D2, then to the coil L2, and then to the ground terminal; thus, the capacitor C3 is charged in the negative direction. The operation described thus far is repeated, so that the load is supplied with the negative supply voltage VOFF, which is the inversion of the input voltage VIN.

In a case where the switching output generator 110 is of a positive step-up type (FIG. 2), when no switching is being performed (before the start of stepping-up), VON=GND if the diode D1 is disconnected (open) and VON=VIN if the diode D1 is connected (non-open). Thus, by monitoring the positive supply voltage VON when no switching is being performed (before the start of stepping-up), it is possible to detect an abnormally open state of the diode D1 and to determine whether or not to start switching operation (step-up operation) on the basis of the result of the detection.

By contrast, in a case where the switching output generator 110 is of an inverted-output type (negative step-up type), when no switching is being performed (before the start of stepping-up), VON=GND irrespective of whether or not the diode D2 is in an abnormally open state. Thus, it is impossible to detect an abnormally open state of the diode D2 by monitoring the negative supply voltage VOFF when no switching is being performed (before the start of stepping-up); this makes it necessary to start switching operation (step-up operation) tentatively.

In such a case, adopting the second embodiment (FIG. 10) described above makes it possible to achieve appropriate overcurrent protection with respect to the input current Iin even when no output current Iout passes due to an abnormally open state of the diode D2.

Specifically, when the diode D2 is in an abnormally open state, even when switching operation (step-up operation) is started, the negative supply voltage VOFF (and hence the feedback voltage Vfb) remains equal to the ground voltage GND. Thus, the upper limit input current IinMAX is held low (i.e., the maximum duty DonMAX of the output transistor P1 is held low). In this way, it is possible to prevent current destruction of the output transistor P1.

Figure 12:
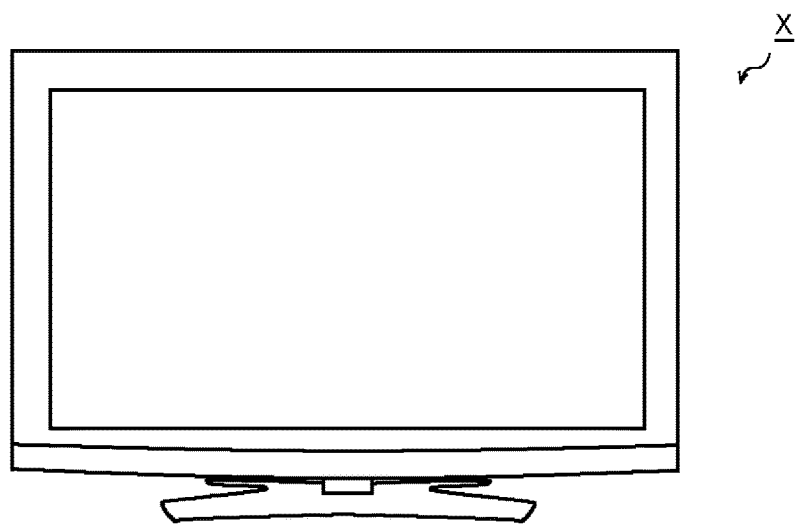
FIG. 12 is an exterior view of a television receiver.

Application to a Television Receiver:

FIG. 12 is an exterior view of a television receiver. The television receiver X is one example of a liquid crystal display device 1, and as a power source for it, the switching power supply circuit 100 described previously can be suitably used.

Modifications:

Although the above description deals with examples where the switching power supply circuit 100 is incorporated in a liquid crystal display device 1 (or a liquid crystal driving device 10), the switching power supply circuit 100 finds wide use as a power source in applications where the load varies cyclically.

The switching output generator 110 may produce its output by any operation other than step-up operation, for example, step-down or step-up/down operation.

The switching output generator 110 may achieve rectification by any method other than diode rectification, for example, synchronous rectification.

Various technical features disclosed herein can be implemented in any manner other than specifically described by way of embodiments above, and allow for many modifications within the spirit of the technical ingenuity involved. For example, bipolar transistors and MOS field-effect transistors are mutually interchangeable, and the logic levels of any of the various signals can be inverted. That is, it should be understood that the embodiments disclosed herein are in every aspect illustrative and not restrictive, and that the technical scope of the present invention is defined not by the description of embodiments given above but by the scope of the appended claims and encompasses any modification in the sense and scope equivalent to those of the claims.

INDUSTRIAL APPLICABILITY

The invention disclosed herein can be used to furnish switching power supply circuits with an improved overcurrent protection function.

What is claimed is:

1. A switching power supply circuit, comprising:
    a switching output generator operable to generate an output voltage from an input voltage by using an output transistor;
    a switching controller operable to turn ON and OFF the output transistor to vary an ON-duty of the output transistor restricted by a maximum duty so as to keep the output voltage, or a feedback voltage commensurate therewith, equal to a predetermined reference voltage; and
    a maximum duty controller operable to vary the maximum duty of the output transistor according to a calculated upper limit value of an input current into switching power supply circuit to prevent current destruction of the output transistor, the upper limit value being calculated with both the input voltage and one of the reference voltage, the output voltage, and the feedback voltage taken into consideration.

2. The switching power supply circuit of claim 1, wherein
    the switching controller includes a digital/analog converter operable to generate the reference voltage, which is an analog voltage, from a reference voltage setting signal, which is a digital signal, and
    the maximum duty controller is operable to vary the maximum duty of the output transistor according to a data value of the reference voltage setting signal.

3. The switching power supply circuit of claim 2, further comprising:
  a reference voltage setter operable to vary the data value of the reference voltage setting signal according to temperature.

4. The switching power supply circuit of claim 1, wherein the maximum duty controller is operable to vary the maximum duty of the output transistor according to not only the reference voltage, the output voltage, or the feedback voltage but also the input voltage.

5. A liquid crystal driving device, comprising the switching power supply circuit of claim 1 as a means for supplying electric power to wherever the electric power is required in the device.

6. A liquid crystal display device, comprising:
  the liquid crystal driving device of claim 5; and
  a liquid crystal display panel that is driven by the liquid crystal driving device.

7. A switching power supply circuit, comprising:
  a switching output generator operable to generate an output voltage from an input voltage by using an output transistor;
  a switching controller operable to turn ON and OFF the output transistor so as to keep the output voltage, or a feedback voltage commensurate therewith, equal to a predetermined reference voltage; and
  a maximum duty controller operable to vary a maximum duty of the output transistor according to the reference voltage, the output voltage, or the feedback voltage;
  wherein
  the switching controller includes:
    a clock signal generator operable to generate a clock signal of a predetermined frequency;
    an error amplifier operable to generate an error voltage that is commensurate with a difference between the output voltage or the feedback voltage and the reference voltage;
    a slope voltage generator operable to generate a slope voltage that is synchronous with ON/OFF control of the output transistor;
    a comparator operable to compare the error voltage with the slope voltage to generate a comparison signal;
    an RS flip-flop operable to receive the clock signal and the comparison signal to output a pulse-width-modulation signal; and
    a driver operable to receive the pulse-width-modulation signal to output an ON/OFF control signal for the output transistor.

8. The switching power supply circuit of claim 7, wherein the switching controller further includes:
  a phase compensator that is connected to an output terminal of the error amplifier to compensate a phase of the error voltage.

9. The switching power supply circuit of claim 7, wherein the maximum duty controller is operable to reset the RS flip-flop forcibly without waiting for a pulse edge in the comparison signal when a maximum ON-period elapses after the RS flip-flop is set by a pulse edge in the clock signal.

10. The switching power supply circuit of claim 9, wherein the maximum duty controller includes:
  a calculator is operable to calculate an upper limit value of an input current that passes into the switching output generator on a basis of the reference voltage, the output voltage, or the feedback voltage;
  a maximum ON-period setter is operable to vary the maximum ON-period according to an output of the calculator;
  a maximum duty setting signal generator is operable to generate a one-shot pulse in a maximum duty setting signal when the maximum ON-period elapses after the RS flip-flop is set by the pulse edge in the clock signal; and
  a logic gate is operable to generate a logically operated signal between the comparison signal and the maximum duty setting signal to feed the logically operated signal to the RS flip-flop.

* * * * *